United States Patent
Fisher et al.

(10) Patent No.: US 6,416,104 B1
(45) Date of Patent: Jul. 9, 2002

(54) VEHICLE BODY WITH RECONFIGURABLE BACK PANEL

(75) Inventors: Kevin M. Fisher, Troy; James S. Gallagher, Rochester Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/757,785

(22) Filed: Jan. 10, 2001

(51) Int. Cl.7 .................................................. B60N 3/12
(52) U.S. Cl. ............... 296/37.16; 296/37.6; 296/190.11
(58) Field of Search ............................. 296/37.16, 37.6, 296/166, 183, 190, 201, 190.11, 37.8; 29/296; 49/380, 332

(56) References Cited

U.S. PATENT DOCUMENTS

| | | | |
|---|---|---|---|
| 2,816,794 A | * 12/1957 | Temp | 296/28 |
| 3,770,312 A | 11/1973 | Shadburn | 296/28 |
| 4,270,790 A | * 6/1981 | Curotto | 296/37.16 |
| 4,315,653 A | 2/1982 | Sparling | 29/296 |
| 4,480,868 A | * 11/1984 | Koto | 296/190 |
| 4,671,013 A | 6/1987 | Friese et al. | 49/380 |
| 4,848,832 A | 7/1989 | Starnes | 296/166 |
| 4,941,702 A | * 7/1990 | Southward | 296/37.6 |
| 5,183,307 A | * 2/1993 | Chiu, Jr. | 296/37.6 |
| 5,263,757 A | * 11/1993 | Reed | 296/37.6 |
| 5,324,089 A | * 6/1994 | Schlachter | 296/37.6 |
| 5,524,951 A | 6/1996 | Johnson | 296/37.6 |
| 5,536,057 A | * 7/1996 | Stewart | 296/37.16 |
| 5,934,727 A | * 8/1999 | Store et al. | 296/37.6 |
| 5,967,584 A | * 10/1999 | McCarthy et al. | 296/37.16 |
| 6,234,560 B1 | * 5/2001 | Hunt | 296/100.11 |
| 6,241,137 B1 | * 6/2001 | Corr | 296/37.6 |
| 6,257,640 B1 | * 7/2001 | Leitner et al. | 296/37.6 |
| 6,260,916 B1 | * 7/2001 | Hunt | 296/190.11 |
| 6,276,751 B1 | * 8/2001 | Ikarashi et al. | 296/190.11 |
| 2001/0017474 A1 | * 8/2001 | Leitner et al. | 296/37.6 |

FOREIGN PATENT DOCUMENTS

DE        1092316        2/1960

OTHER PUBLICATIONS

"Chevy Avalanche Forever Alters Truck Landscape", Chevrolet Communications, Chevrolet Media Online, Jan. 10, 2000, 3 pages.

* cited by examiner

Primary Examiner—Ken Patel
(74) Attorney, Agent, or Firm—Laura C. Hargitt

(57) ABSTRACT

A vehicle body has a reconfigurable back panel and window system for use in an extended cab pickup truck or other similar vehicle in which the rear wall of the vehicle is adaptable for use in various optional configurations. A forward convertible compartment communicates with a rear cargo compartment through an access opening in a body frame. A lower closure panel, intermediate crossbar and upper window optionally close the opening to separate the compartments for passenger and cargo use. The window may be removed and stored in the panel, the panel may be pivoted open and the crossbar may be moved with the panel or remain to support the window, all permitting varying degrees of communication between the compartments for carrying passengers or cargo as desired.

8 Claims, 4 Drawing Sheets

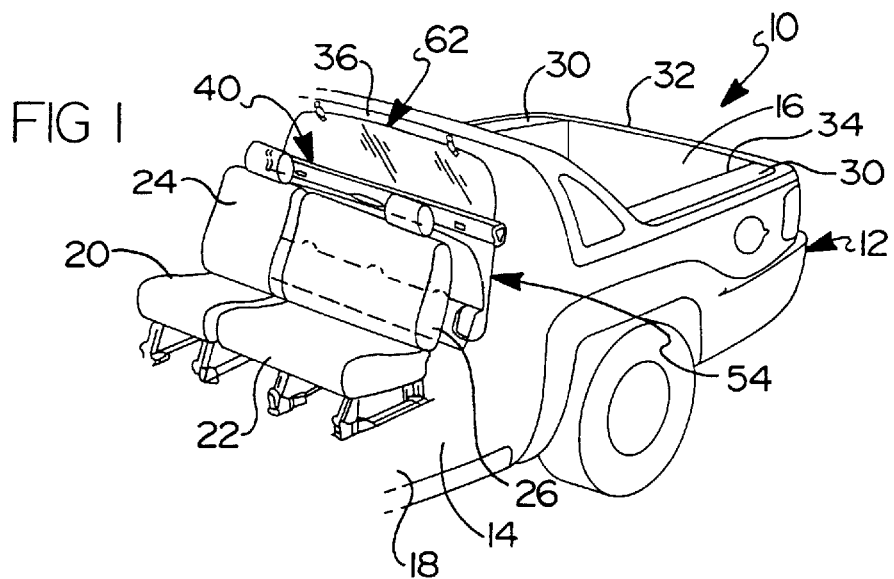
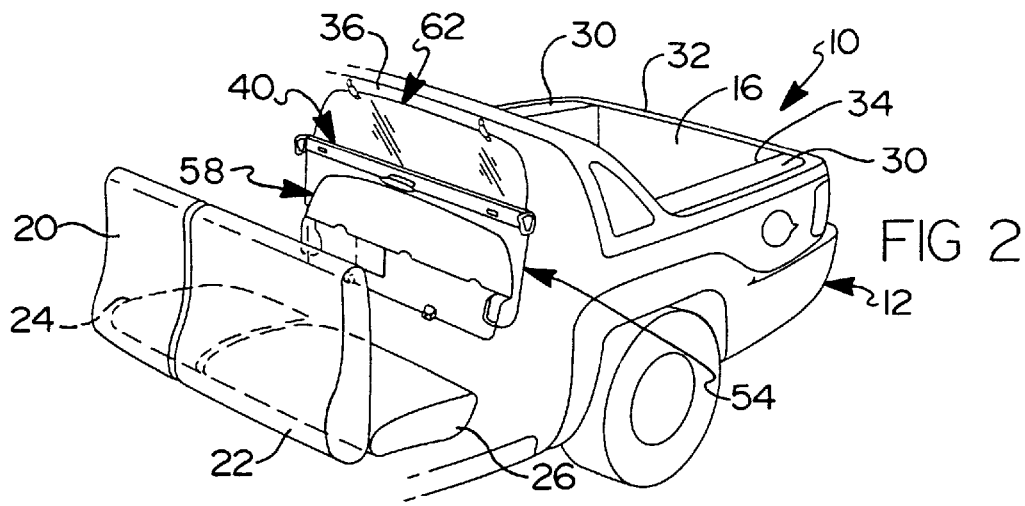
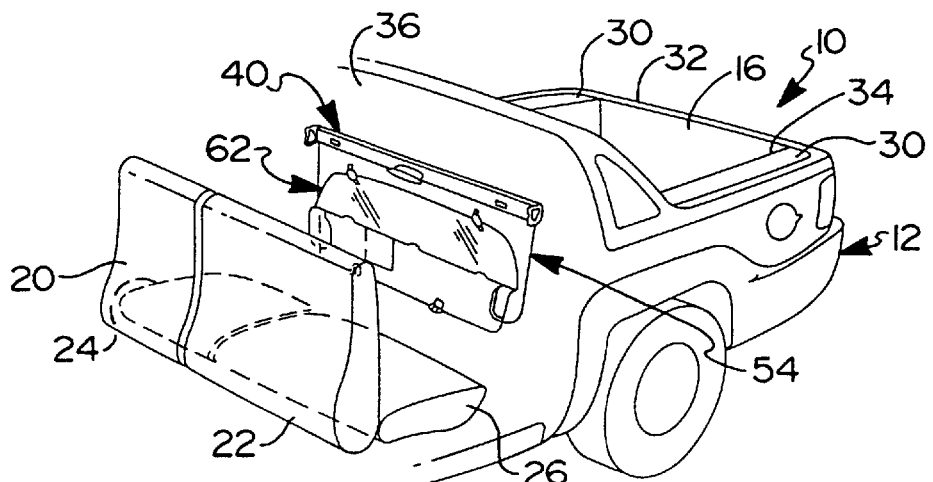

VEHICLE BODY WITH RECONFIGURABLE BACK PANEL

TECHNICAL FIELD

This invention relates to vehicles, such as pickup trucks, in which a rear wall of the vehicle passenger compartment is adaptable to provide various configurations for optionally increasing cargo space by extension into the rear passenger area or, alternatively, closing off the cargo area from the passenger compartment.

BACKGROUND OF THE INVENTION

It is known in the art to provide a pickup truck having a cab portion for carrying passengers in a rear seat section behind the driver and a cargo box behind the cab portion for carrying cargo. It is also known to provide aligned openings in the cab portion and the cargo box for carrying longer loads which extend into the passenger compartment with the rear seat folded down. However, a need exists for providing a pickup truck or similar vehicle with a flexible panel and window system that is adapted to accommodate a variety of optional configurations for alternatively carrying a maximum passenger load or an extended cargo load under both covered and uncovered conditions where the cargo load is protected from or exposed to ambient external conditions.

SUMMARY OF THE INVENTION

The present invention provides a reconfigurable back panel and window system for use in an extended cab pickup truck or other similar vehicle in which the rear wall of the vehicle body is adaptable for use in various optional configurations.

In a passenger carrying mode, a rear seat is positioned in the body in a passenger carrying position ahead of a frame defining a rear opening. A lower portion of the opening is closable by a reconfigurable back panel. Above the panel, an upper portion of the opening is optionally closed by a removable and storable rear window. Manual means are preferably provided for retaining and allowing removal and storage of the window in a storage pocket of the back panel to allow additional cab ventilation or communication with the rear cargo compartment.

Conventionally, the rear seat of the passenger compartment may be folded down to allow carrying of cargo within the passenger compartment on the back of the folded down seat. Behind the seat, the back panel acts as a closure panel for closing a lower portion of the rear opening below the window. The panel is pivotable inward about a lower pivot axis to fold down over the back of the rear seat and open communication through the lower portion of the rear opening between the cargo compartment and the rear portion of the passenger compartment for carrying cargo extending between the two compartments.

A crossbar preferably extends transversely across the rear wall between the upper and lower portions of the opening. The crossbar is attachable to the frame by retainer means, such as releasable latches at opposite ends of the crossbar engaging striker assemblies on opposite sides of the frame. A second pair of latches within the crossbar are engaged by strikers on the panel to releasably retain the panel to the crossbar. Preferably, a control handle on the crossbar may be actuated to independently release either of the pairs of latches to allow opening of the panel with the crossbar retained in the frame or opening of the panel with the crossbar attached to the panel and released from the frame.

A channel in the crossbar provides a mounting portion for the window. Latches in an upper portion of the frame releasably retain the window in the closed position.

The reconfigurable back panel and window system thus allows for a variety of configurations in which the vehicle may be used, including:

a rear passenger mode with the rear window closed or open and stored;

an interior cargo mode with the rear seats forward and the panel and window closed to separate the interior and exterior compartments;

a first communication mode with the back panel closed and the rear window open and stored;

a second communication mode with the window stored and the back panel and crossbar open to provide full access through the rear opening between the interior and exterior compartments; and a third communication mode with the rear window closed and the back panel open.

These and other features and advantages of the invention will be more fully understood from the following description of certain specific embodiments of the invention taken together with the accompanying drawings.

BRIEF DESCRIPTION OF THE DRAWINGS

In the drawings:

FIG. 1 is a pictorial view of a rear portion of a truck body showing rear seats in a passenger carrying mode;

FIG. 2 is a pictorial view showing an interior cargo mode;

FIG. 3 is a pictorial view showing interior and exterior compartments in a first or upper communication mode through a window opening;

DESCRIPTION OF THE PREFERRED EMBODIMENT

Figure 4:
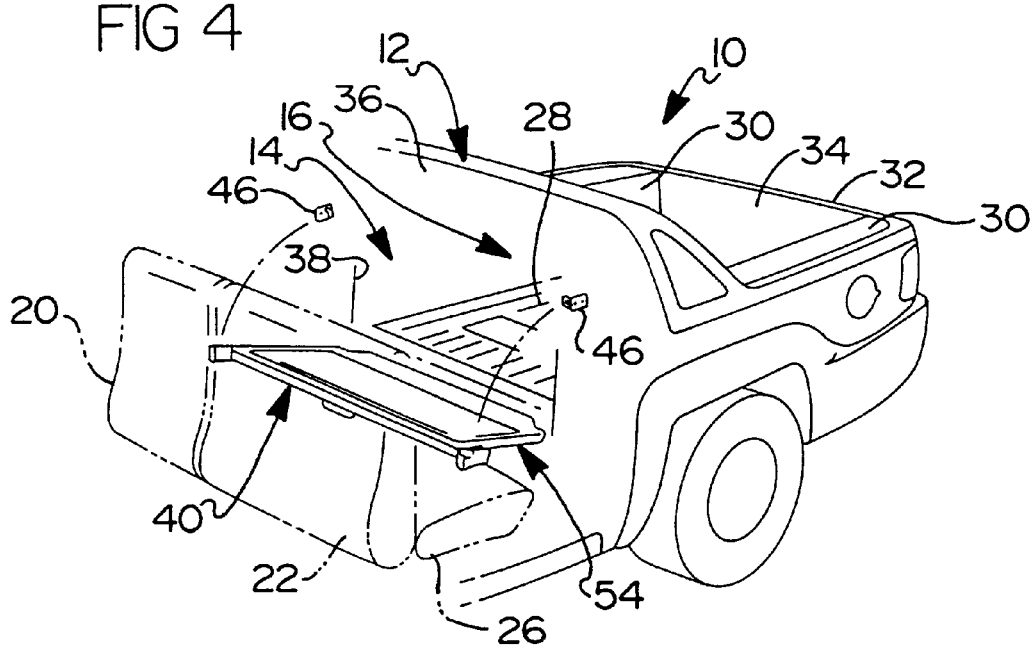
FIG. 4 is a pictorial view showing a second or full communication mode through the fully open panel frame with the window stored.

Referring now to the drawings in detail, FIGS. 1–5 illustrate the rear portion of a vehicle 10, such as a pickup truck or sport utility vehicle. The front portion of the vehicle is not shown but includes a front compartment for a driver and front passenger. In addition, vehicle 10 includes a body 12 having a rear passenger carrying internal compartment, designated herein for purposes of description as a first compartment 14, and a rearwardly adjacent cargo carrying external (open topped) compartment, designated herein as a second compartment 16.

The first compartment includes a floor 18 carrying a pair of split bench seats each including seat cushions 20, 22 and seat backs 24, 26. The seat cushions 20, 22 and seat backs 24, 26 are pivotally mounted to the floor 18 for movement between passenger carrying positions, shown in solid lines in FIG. 1, and cargo carrying positions, shown partially in phantom lines in FIGS. 2–5. The first compartment 14 is conventionally enclosed by side walls or doors and a roof, not shown, essentially enclosing the seats and passengers or cargo carried therein. The second compartment 16 also includes a floor 28, side walls 30 and a tailgate 32, if desired, to form a partially enclosed cargo bed having an open top 34. If desired, the top 34 could be closed by a suitable cover, not shown.

Figure 6:
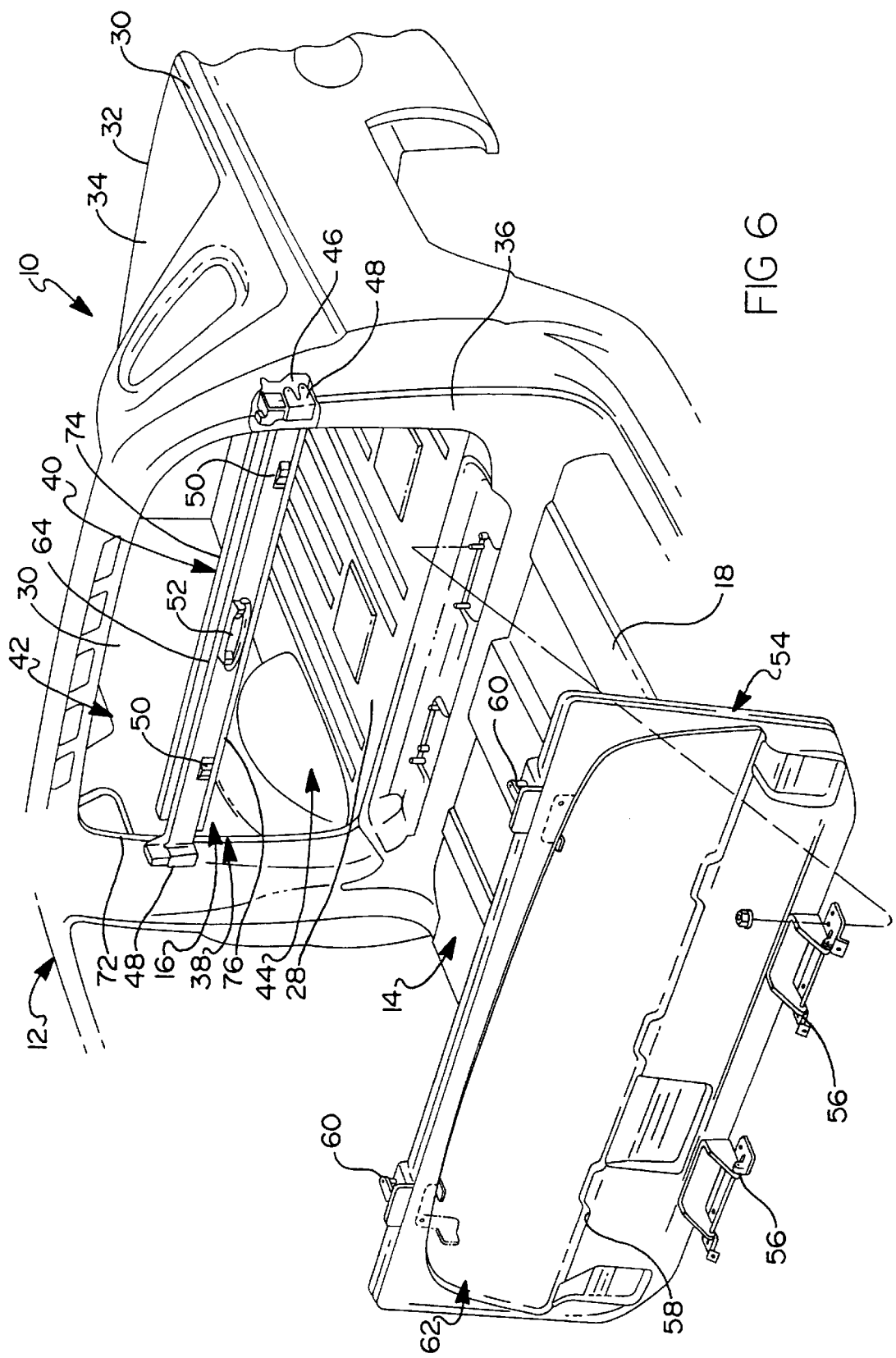
FIG. 6 is a pictorial view showing installation of the reconfigurable panel assembly with the crossbar in place.
Figure 7:
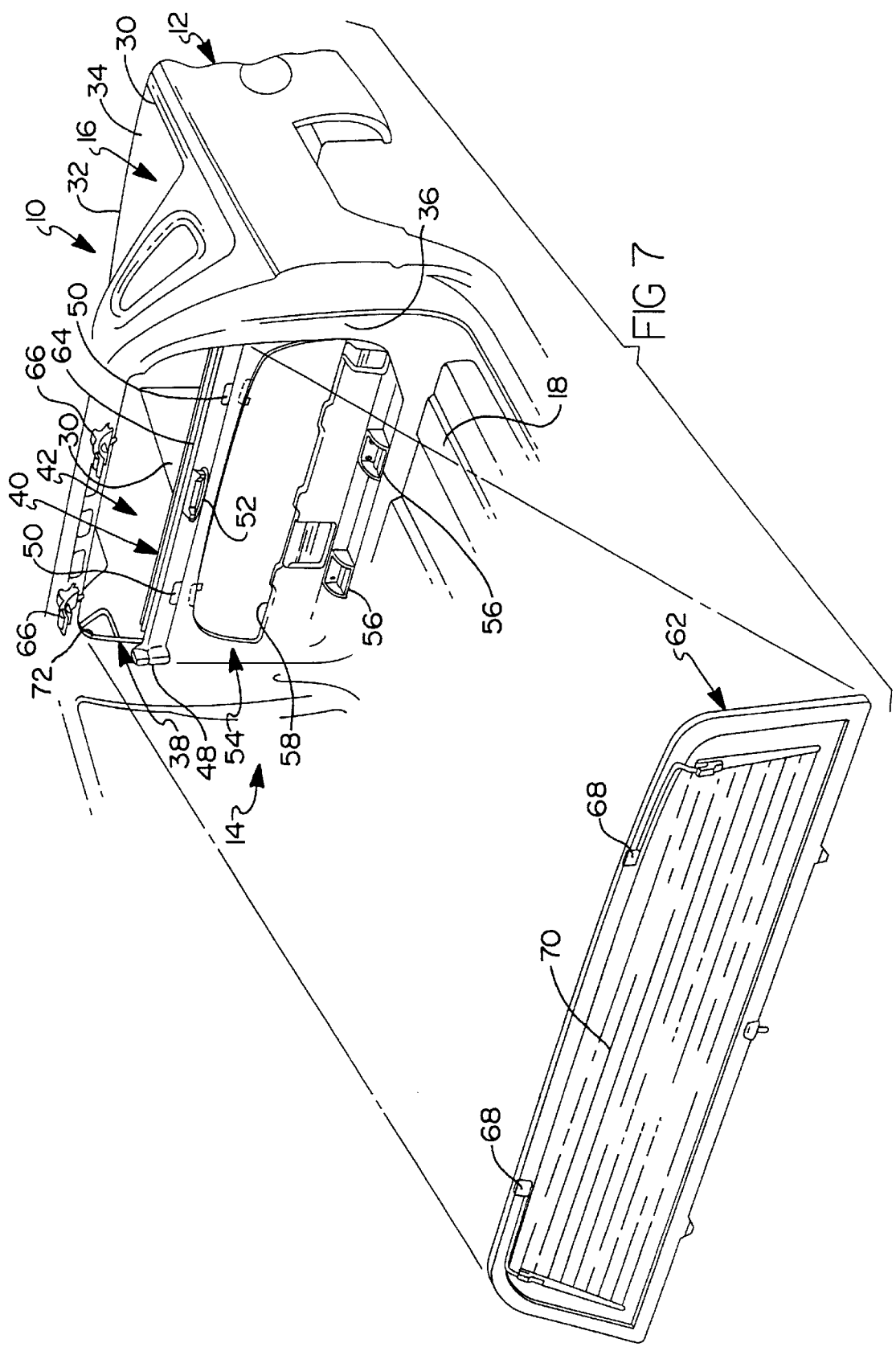
FIG. 7 is a pictorial view showing installation and retention of the removable window.

As is best shown in FIGS. 6 and 7, body 12 includes a peripheral frame 36 located between the first and second compartments. Frame 36 defines an opening 38 that allows full communication between the compartments. A crossbar 40 is mountable transversely in the frame and effectively separates the access opening 38 into upper and lower portions 42, 44. The crossbar is retained in the frame by strikers 46 mounted in the frame and engaged by a pair of latches 48 mounted on opposite ends of the crossbar. The crossbar 40 also mounts a second pair of latches 50 accessed through openings on an interior side of the crossbar for a purpose to be subsequently described. Both pairs of latches may be actuated independently by a control handle 52 mounted on the interior side of the crossbar.

A closure panel or back panel 54 is pivotally mounted on hinges 56 secured to a lower edge of the frame 36. A receptor or storage pocket 58 is provided on the front side of the panel in its closed position for a purpose to be subsequently made clear. The panel includes strikers 60 mounted along an upper edge of the panel and engagable with the second latches 50 of the crossbar for latching the panel in an upright closed position. In the closed position, the panel 54 closes the lower portion 44 of the access opening 38 against entry therethrough of exterior materials through the open second compartment.

A backlite or rear window 62 is supported in mounting means, such as a channel 64, along the upper edge of the crossbar 40 and, when installed, closes the upper portion of the access opening 38 against the entry of external materials. The window is retained in the opening upper portion by latches 66 mounted on or adjacent an upper edge of the frame 36 in the body 12. The latches may engage metal tabs 68 spaced on the upper edge of the window and electrically connected to a rear window defogger grid 70 on the window, so that low voltage electric current may be provided to the grid through the latches. The various latches, strikers and other associated elements are exemplary of various types of retainers which may be used for holding the various components of the invention in their positions as described.

Suitable seals may be provided to seal the edges of the window, panel and crossbar when assembled into the frame access opening 38. These may include a weatherstrip 72 around the edges of the frame and upper and lower seals 74, 76 on the crossbar 40 for engaging the window and panel, respectively. The seals act to seal the joints against the entry of water, air or odors and the structures of the panel 54, crossbar 40 and window 62 mechanically exclude entry of solid materials or cargo from the second compartment 16.

FIGS. 1–5 illustrate various operating modes of the reconfigurable back panel and associated elements of the above-described embodiment of the invention. FIG. 1 shows a passenger carrying mode in which the panel 54, crossbar 40 and window 62 are mounted in the frame 36, closing the access opening 38. The seat backs 24, 26 and seat cushions 20, 22 are pivoted rearward in position to seat up to three passengers in the interior first compartment in an enclosed environment protected by the rear panel, crossbar and window.

FIG. 2 shows an interior cargo mode in which the seat cushions 20, 22 are pivoted forward and the seat backs 24, 26 are pivoted down so that cargo, such as boxed materials, may be carried internally on the upwardly facing rear surfaces of the seat backs. The cargo is protected from external elements by the back panel elements, which remain in place closing the access opening 38.

FIG. 3 shows a ventilated compartment or first communication mode in which the rear window has been removed by manually releasing the latches 66 and removing the window 62 from the mounting channel 64 in the crossbar 40. The removed window is stored for protection in the receptor or storage pocket 60 on the front of the panel 54. In this mode, the upper portion 42 of the opening 38 is open for communication between the compartments for the transfer of cargo or objects therebetween and for ventilation of the vehicle interior if desired. In a variation of this mode, the seats may be repositioned as in FIG. 1 for carrying passengers while the first compartment remains open to rear ventilation through the upper portion 42, as shown in FIG. 3.

FIG. 4 shows a full access or second communication mode in which the panel 54 with the stored window 62 as shown in FIG. 3 is pivoted forward with the crossbar 40 attached. The control handle 52 is actuated to release the end latches 48, disconnecting the crossbar from the frame 36 and allowing the crossbar and panel to be pivoted down into engagement with the folded down seat backs 24, 26. The window remains protected in the storage pocket 58 on the front of the panel and above the seat backs. In this mode, the full access opening is unblocked for full communication of the first and second compartments including the transfer of cargo therebetween and the carrying of longer cargo which extends into both compartments. Of course, in this mode, the first compartment would be open to the entry of ambient air or water into the interior of the normally enclosed compartment but the carrying of larger cargo would be permitted.

Figure 5:
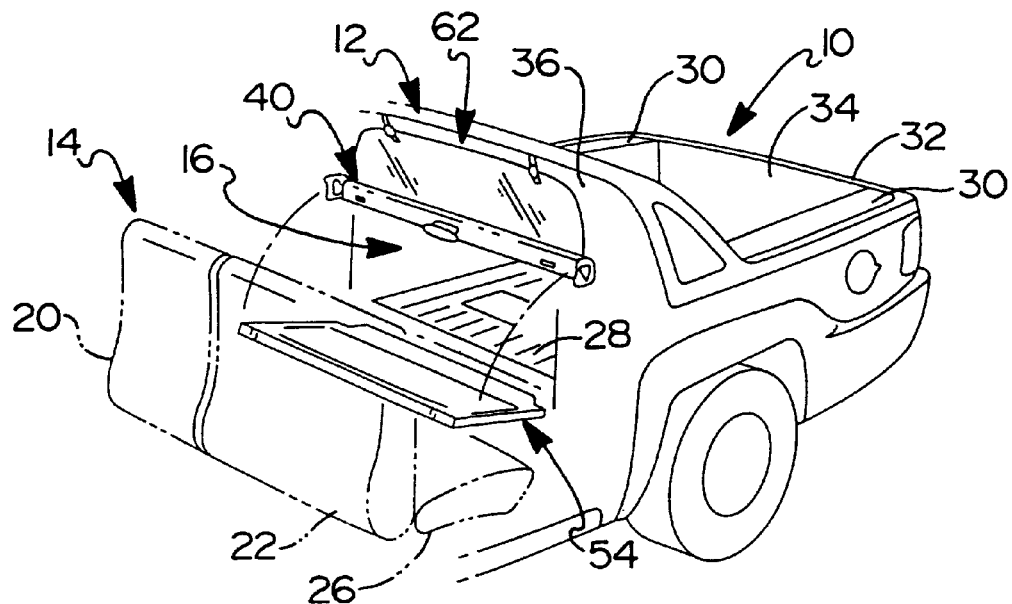
FIG. 5 is a pictorial view showing a third or lower communication mode through a lower panel opening.

FIG. 5 shows a lower access or third communication mode where the arrangement of FIG. 2 is modified by actuating the control handle 52 to release the front latches 50. The back panel 54 is then pivoted forward and down against the seat backs 24, 26 which lie against the floor 18 of the first compartment 14. The crossbar 40 remains in place latched to the frame 36 with the window in its closed position and latched to the frame as in FIGS. 1 and 2. The lower portion 44 of the access opening is thus clear for free communication between the first and second compartments and the carrying of larger cargo. In a variation of this mode, a conventional box cover or cargo cover may be applied to the normally open second (cargo) compartment, with the possible need for additional seals. Thus, both compartments and any cargo therein may be protected from exposure to exterior ambient conditions, such as rain or snow.

Preferably, the crossbar latches are interlocked so that the end latches cannot be actuated to release the crossbar from the frame unless the rear window has first been removed. The continuing support of the in place rear window by the crossbar is thus assured. Likewise, the front latches that secure the back panel to the crossbar cannot be released when the rear window has first been removed. Thus, the crossbar is only movable with the back panel, and then only when the window has been removed and stored. From the foregoing, it may be understood that the vehicle body of the invention is reconfigurable by movement of the rear seats, rear panel, rear window and crossbar to create a cargo and passenger vehicle with variable capacity and conditions of use.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A vehicle body having a first compartment for carrying passengers or cargo and a second compartment for carrying cargo rearwardly adjacent the first compartment, said body including:
   a frame defining an opening between the first and second compartments, the opening including lower and upper portions, each portion allowing access between the compartments;
   a closure panel mounted to the frame and movable between a panel closed position closing said lower portion of the opening and a panel open position permitting access through the lower portion between the first and second compartments;
   a crossbar mountable in the opening between the upper and lower portions and including a panel retainer engagable with the panel to releasably retain the panel in the closed position; and
   a window removably mountable in the frame and cooperating with the crossbar to close the upper portion of the opening.

2. A vehicle body as in claim 1 wherein said crossbar includes a mounting portion for supporting the window in the frame.

3. A vehicle body as in claim 2 wherein said body includes a window retainer for releasably retaining the window in the frame.

4. A vehicle body as in claim 1 wherein said crossbar is removably mountable in the frame.

5. A vehicle body as in claim 4 wherein said crossbar is movable with the panel to the open position.

6. A vehicle body as in claim 1 wherein said panel includes a receptor for releasably storing the window when it has been removed from the frame, the receptor being capable of retaining the stored window in both the open and closed positions of the panel.

7. A vehicle body as in claim 1 wherein said first compartment contains passenger carrying seats, said seats being movable between a passenger carrying position and a cargo carrying position, said panel being movable to the open position only when the seats are in the cargo carrying position.

8. A vehicle body as in claim 7 wherein said panel may be moved to the open position in any one of a first condition wherein the crossbar remains in the frame supporting the window in its closed position, and a second condition wherein the window is stored in the panel and the crossbar remains attached to and opens with the panel.

\* \* \* \* \*